United States Patent
Yang et al.

(10) Patent No.: US 9,928,882 B1
(45) Date of Patent: Mar. 27, 2018

(54) SCREW-FREE REMOVABLE HARD DISK CASE

(71) Applicant: Super Micro Computer Inc., San Jose, CA (US)

(72) Inventors: Jerry C. Yang, San Jose, CA (US); Lawrence H. Liang, San Jose, CA (US); Richard S. Chen, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 0 days.

(21) Appl. No.: 15/469,489

(22) Filed: Mar. 25, 2017

(51) Int. Cl.
| | |
|---|---|
| *G06F 1/16* | (2006.01) |
| *H05K 5/00* | (2006.01) |
| *H05K 7/00* | (2006.01) |
| *G11B 33/02* | (2006.01) |
| *G11B 33/14* | (2006.01) |
| *G11B 33/04* | (2006.01) |
| *G11B 33/06* | (2006.01) |

(52) U.S. Cl.
CPC ........ *G11B 33/022* (2013.01); *G11B 33/0405* (2013.01); *G11B 33/06* (2013.01); *G11B 33/142* (2013.01); *G11B 33/1493* (2013.01)

(58) Field of Classification Search
CPC ....... G06F 1/183; G06F 1/187; G11B 33/022; G11B 33/0405; G11B 33/06; G11B 33/142; G11B 33/1493
USPC ........................................ 361/679.33–679.39
See application file for complete search history.

(56) References Cited

U.S. PATENT DOCUMENTS

| | | | | |
|---|---|---|---|---|
| 7,492,585 B2* | 2/2009 | Zhang | ..................... | G06F 1/187 312/334.7 |
| 7,495,908 B2* | 2/2009 | Zhang | .................. | G11B 33/123 361/679.33 |
| 7,639,492 B2* | 12/2009 | Thomas | .................. | G06F 1/187 361/679.33 |
| 8,763,967 B2* | 7/2014 | Fu | ........................... | G06F 1/187 211/26.2 |
| 9,128,680 B2* | 9/2015 | Chi | ......................... | G06F 1/187 |
| 2004/0037049 A1* | 2/2004 | Erickson | ................. | G06F 1/184 361/726 |
| 2007/0019377 A1* | 1/2007 | Chen | ...................... | G06F 1/187 361/679.31 |
| 2008/0204994 A1* | 8/2008 | Wang | .................. | G11B 33/121 361/679.37 |
| 2012/0236494 A1* | 9/2012 | Wallace | ............... | H05K 7/1489 361/679.37 |

* cited by examiner

*Primary Examiner* — Anthony Haughton
(74) *Attorney, Agent, or Firm* — Chung-Ming Shih; HDLS IPR Services (57) ABSTRACT

A screw-free removable hard disk case includes a carrier, a slide rail and a slide sheet. The carrier includes a first lateral plate and a second lateral plate which define an accommodation space, the first lateral plate is formed with an elastic arm disposed with an insertion pin; the slide rail is disposed at an outer side of the first lateral plate, and formed with a slide groove corresponding to the elastic arm; the slide sheet is combined between the slide rail and the first lateral plate with a sliding means and exposed in the slide groove, the insertion pin is pressed by the slide sheet for being inserted in a lock hole correspondingly formed on a hard disk, so that the hard disk can be combined in the accommodation space through the insertion pin and the lock hole being mutually buckled.

10 Claims, 11 Drawing Sheets

SCREW-FREE REMOVABLE HARD DISK CASE

BACKGROUND OF THE INVENTION

Field of the Invention

The present invention relates to a removable hard disk case, especially to a screw-free removable hard disk case.

Description of Related Art

At present, removable hard disk cases are adopted for being served as storage devices arranged in an array format in a server. A conventional removable hard disk case is required to be pre-fixed in a rack, and then the rack is fastened in a machine frame. The combination of the conventional removable hard disk case and the rack requires a lot of screws for the purpose of fastening, so that the assembly is time consuming, the production is relatively slow, additional cost for purchasing the screws is required and the whole production cost is inevitably increased.

When the hard disks in the serve have to be frequently replaced or the required quantity is considerable, the screw fastening means costs way too much time, the disassembly and assembly operation has to be done by utilizing hand tools, and the disassembly/assembly process is complicated and inconvenient, thus the above-mentioned disadvantages shall be improved.

Accordingly, the applicant of the present invention has devoted himself for improving the mentioned disadvantages.

SUMMARY OF THE INVENTION

The present invention is to provide a screw-free removable hard disk case, which has an advantage of fastening a hard disk without utilizing any screw, thereby increasing the operation convenience.

Accordingly, the present invention provides a screw-free removable hard disk case including a carrier, a slide rail and a slide sheet. The carrier includes a first lateral plate and a second lateral plate which define an accommodation space, the first lateral plate is formed with an elastic arm, and the elastic arm is disposed with an insertion pin; the slide rail is disposed at an outer side of the first lateral plate, and formed with a slide groove corresponding to the elastic arm; the slide sheet is combined between the slide rail and the first lateral plate with a sliding means and exposed in the slide groove, the insertion pin is pressed by the slide sheet for being inserted in a lock hole correspondingly formed on a hard disk, so that the hard disk is able to be combined in the accommodation space through the insertion pin and the lock hole being mutually buckled.

In comparison with related art, the present invention has advantageous features as follows. According to the screw-free removable hard disk case provided by the present invention, one side of the hard disk is able to be leaned against the lateral plate through a positioning hole and a positioning sheet being mutually positioned; and with the installation of the elastic arm of the lateral plate, the slide sheet and the slide rail and through the slide sheet sliding in the slide rail and being pressed by the elastic arm for enabling the insertion pin at one distal end of the elastic arm to be inserted in the lock hole of the hard disk so as to be mutually buckled for positioning, another side of the hard disk is able to be positioned, so that the hard disk can be stably combined in the accommodation space, because the assembly does not requires any screw and hand tool, the complicated assembling process can be simplified and the operation convenience can be further provided.

DETAILED DESCRIPTION OF THE INVENTION

A preferred embodiment of the present invention will be described with reference to the drawings.

Figure 1:
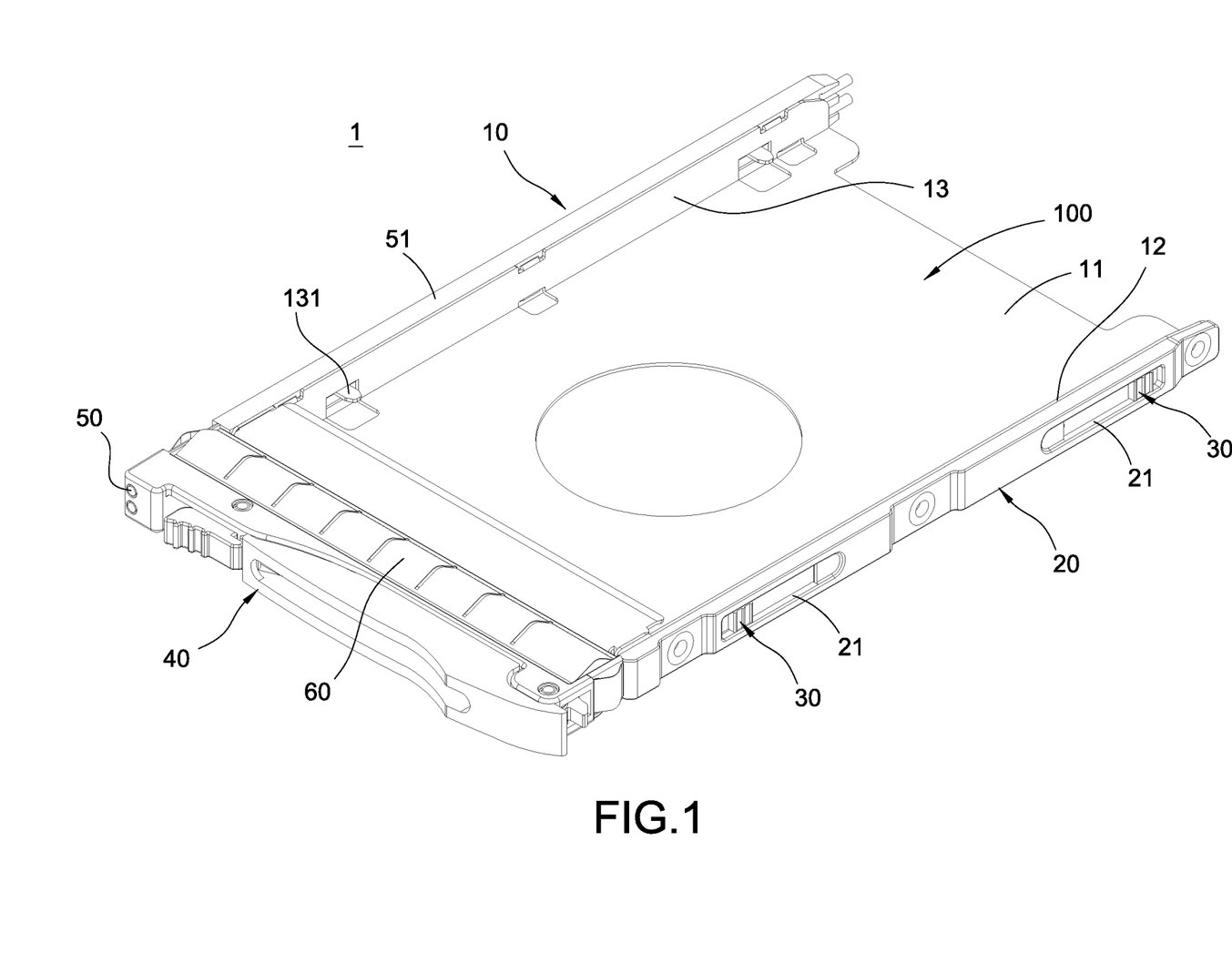
FIG. 1 is a perspective view showing the appearance of a screw-free removable hard disk case according to the present invention.
Figure 2:
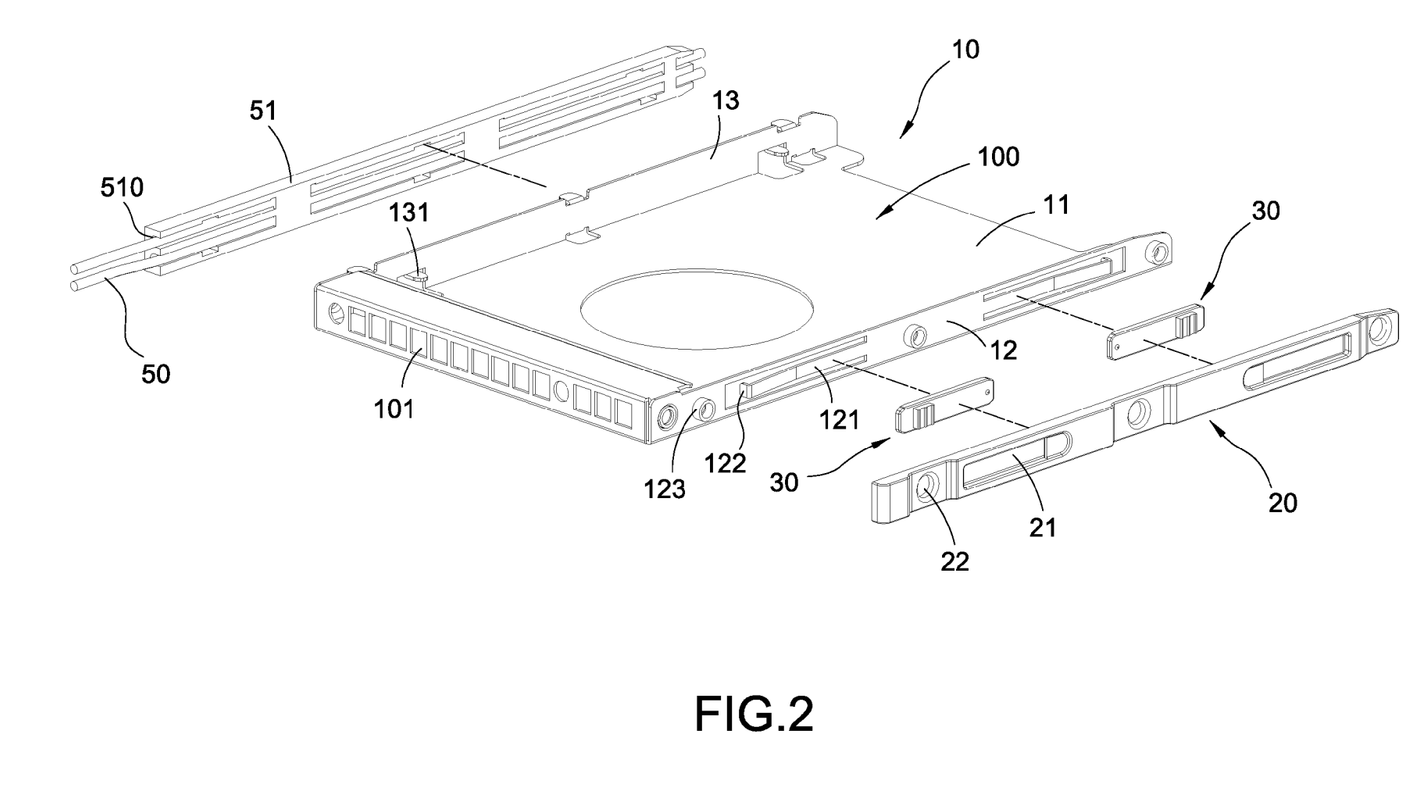
FIG. 2 is a perspective exploded view showing a slide rail and a carrier according to the present invention.
Figure 3:
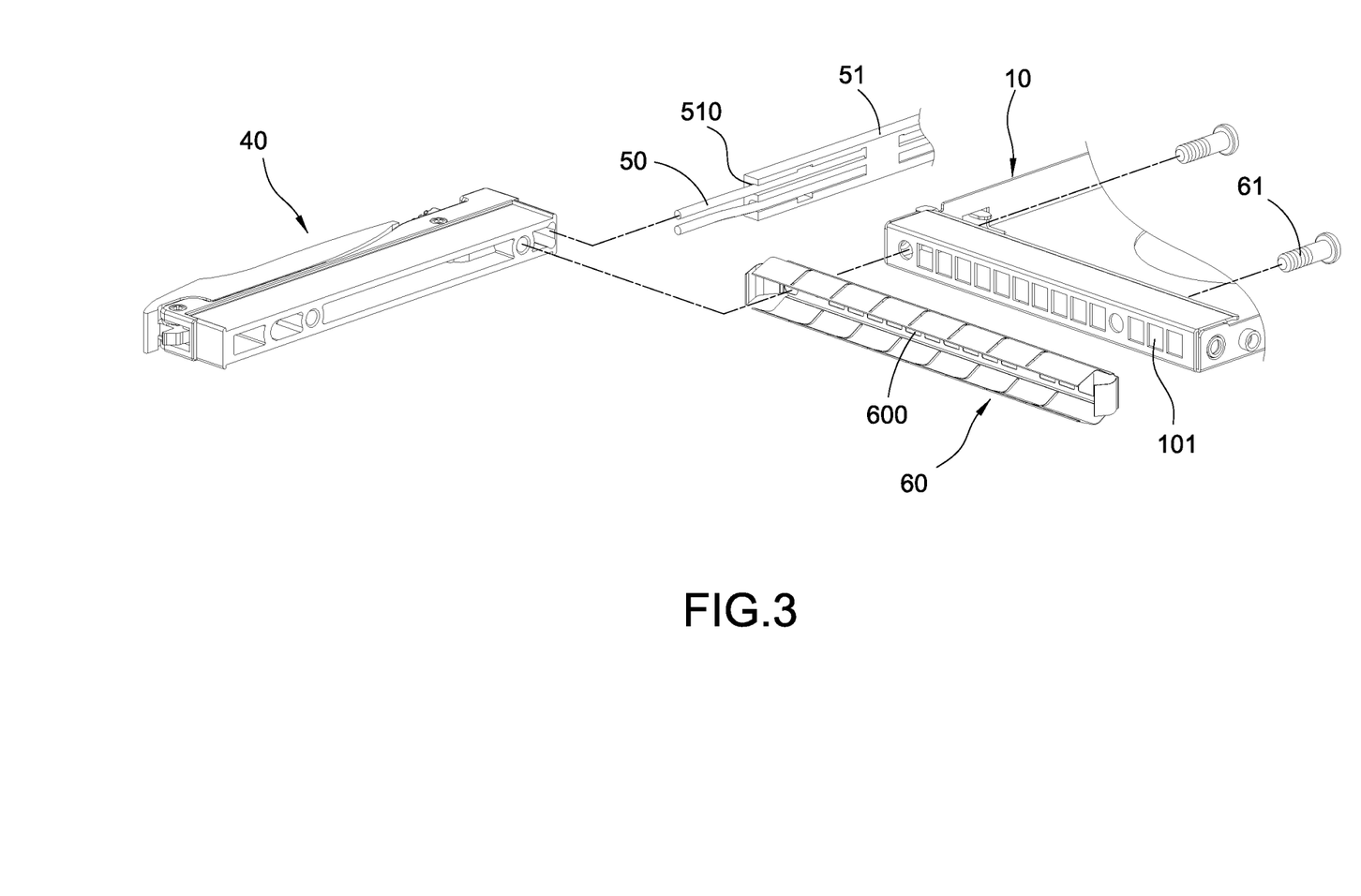
FIG. 3 is a perspective exploded view showing the carrier and a handle structure according to the present invention.
Figure 6:
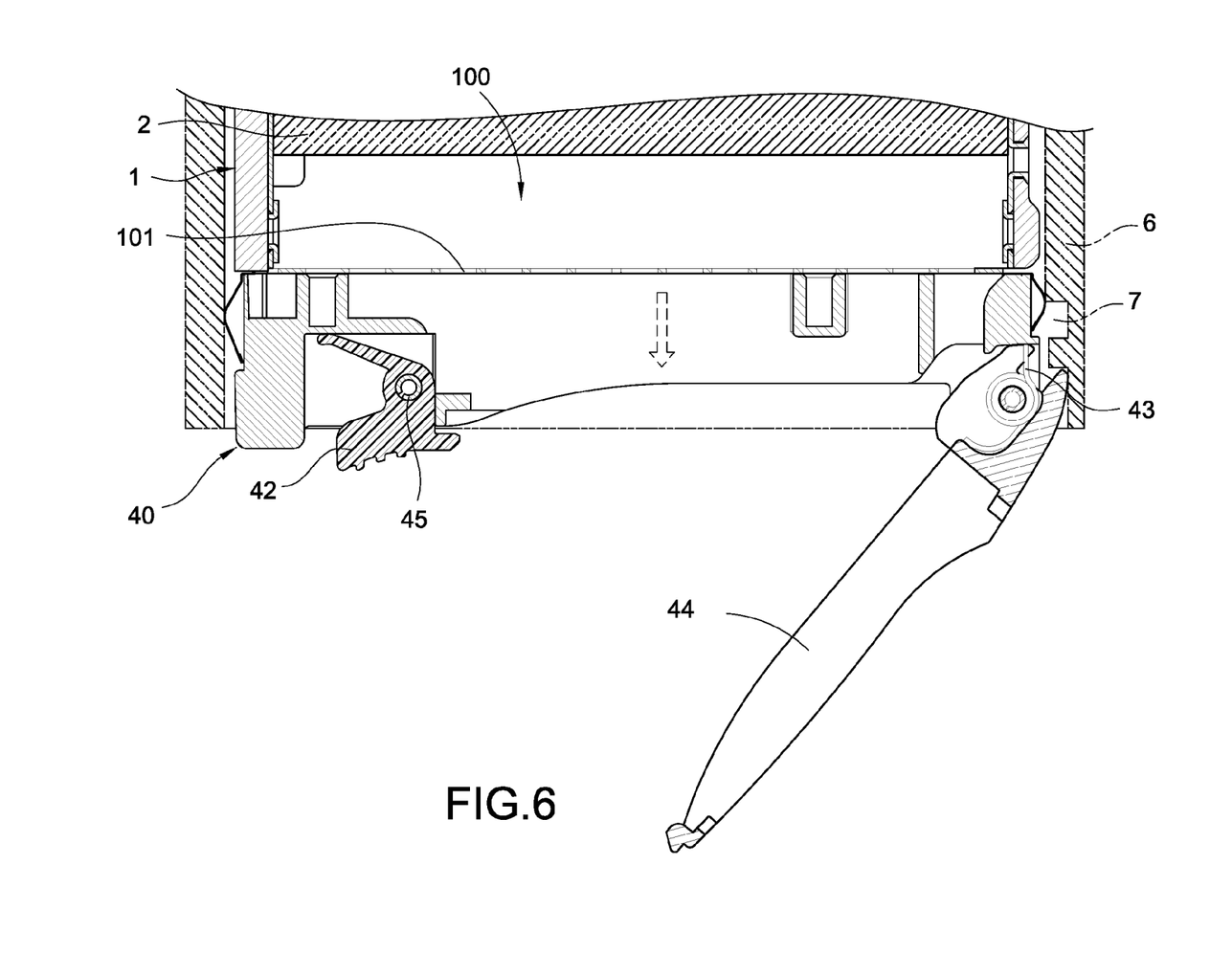
FIG. 6 is a schematic view showing the handle structure being in an opened status according to the present invention.

Please refer from FIG. 1 to FIG. 3, wherein FIG. 1 is a perspective view showing the appearance of a screw-free removable hard disk case according to the present invention; FIG. 2 is a perspective exploded view showing a slide rail and a carrier according to the present invention; and FIG. 3 is a perspective exploded view showing the carrier and a handle structure according to the present invention. The present invention provides a screw-free removable hard disk case 1, which includes a carrier 10, a slide rail 20, at least one slide sheet 30 and a handle structure 40. The slide rail 20 and the at least one slide sheet 30 are combined at one side of the carrier 10 for positioning a hard disk 2 having at least one lock hole 3 (as shown in FIG. 6). The handle structure 40 is disposed at a front side of the carrier 10, thereby enabling the carrier 10 to be removable. More detailed disclosures for the structure of the screw-free removable hard disk case 1 are provided as follows.

The carrier 10 includes a bottom plate 11, a first lateral plate 12 and a second lateral plate 13 connected to the bottom plate 11. An accommodation space 100 is defined by the bottom plate 11, the first lateral plate 12 and the second lateral plate 13. The first lateral plate 12 is formed with at least one elastic arm 121, one distal end (a free end) of the elastic arm 121 is disposed with at least one insertion pin 122 corresponding to the lock hole 3 of the hard disk 2.

The slide rail 20 is disposed at an outer side of the first lateral plate 12, and the slide rail 20 is formed with a slide groove 21 corresponding to the elastic arm 121. According to this embodiment, the first lateral plate 12 is formed with a plurality of convex pieces 123, and the slide rail 20 is correspondingly formed with a plurality of buckle holes 22. The slide rail 20 is combined with the first lateral plate 12 through the buckle holes 22 and the convex pieces 123 which are formed between the slide rail 20 and the first lateral plate 12 and mutually buckled with each other. Moreover, the slide sheet 30 is combined between the slide rail 20 and the first lateral plate 12 with a sliding means and exposed in the slide groove 21.

As shown in FIG. 2, according to one embodiment of the present invention, the screw-free removable hard disk case 1 further includes a plurality of light guiding units 50 for providing an indicating function (for example displaying lights during operation) and a support plate 51. The support plate 51 is combined at an outer side of the second lateral plate 13 and formed with a plurality of penetrated slots 510. The light guiding units 50 are correspondingly disposed in the penetrated slots 510, and one end of each of the light guiding units 50 is exposed out of the handle structure 40.

Substantially speaking, according to the present invention, there are two lock holes 3 formed at one side of the hard disk 2, there are two elastic arms 121 formed on the first lateral plate 12, the two elastic arms 121 are arranged at two ends of the first lateral plate 12 respectively and each of the two elastic arms 121 has the above-mentioned insertion pin 122. In addition, there are two slide grooves 21, which are corresponding to the two elastic arms 121, formed in the slide rail 20, the amount of the slide sheets 30 is corresponding to the amount of the elastic arms 121 and the amount is two, the two slide sheets 30 are respectively displaced in the two slide grooves 21 towards the directions away from each other, so that the insertion pins 122 of the two elastic arms 121 are enabled to be respectively inserted in the two lock holes 3 of the hard disk 2.

As show in FIG. 3, the screw-free removable hard disk case 1 further includes an electromagnetic interference (EMI) clip 60, the EMI clip 60 is fastened between the carrier 10 and the handle structure 40 by utilizing a plurality of fastening members 61, and the installation of the EMI clip 60 is to provide an EMI effect to the hard disk 2.

Figure 4:
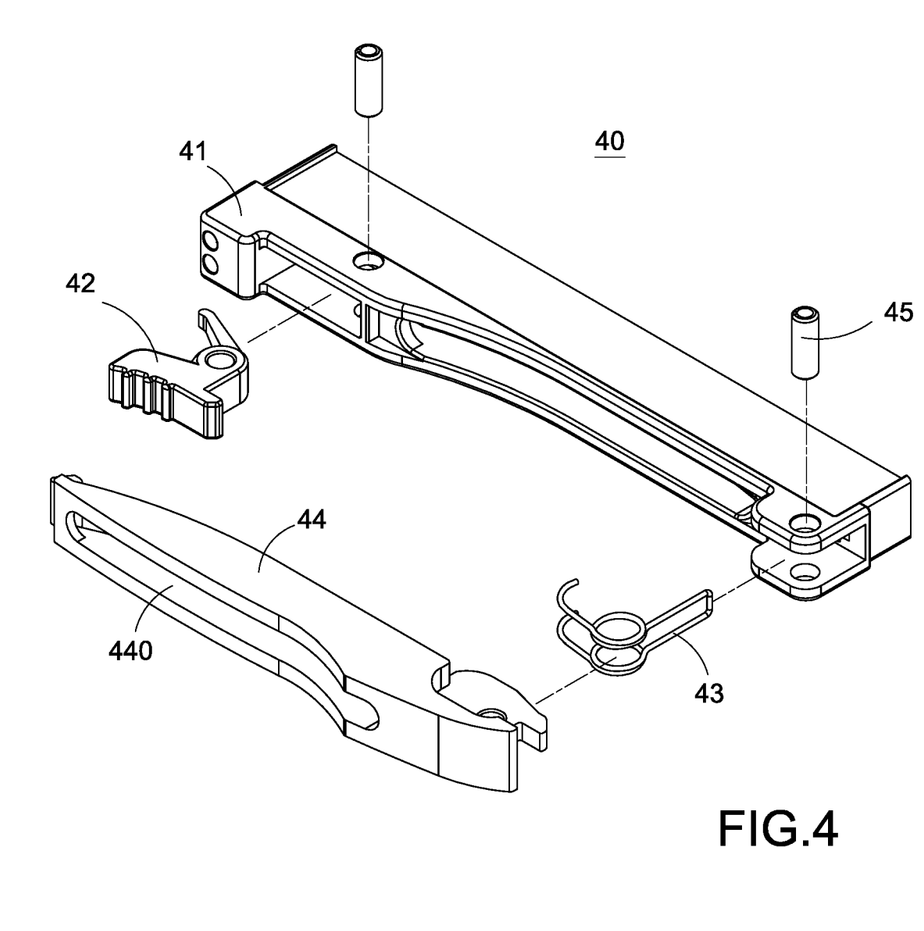
FIG. 4 is a perspective exploded view showing the handle structure according to the present invention.
Figure 5:
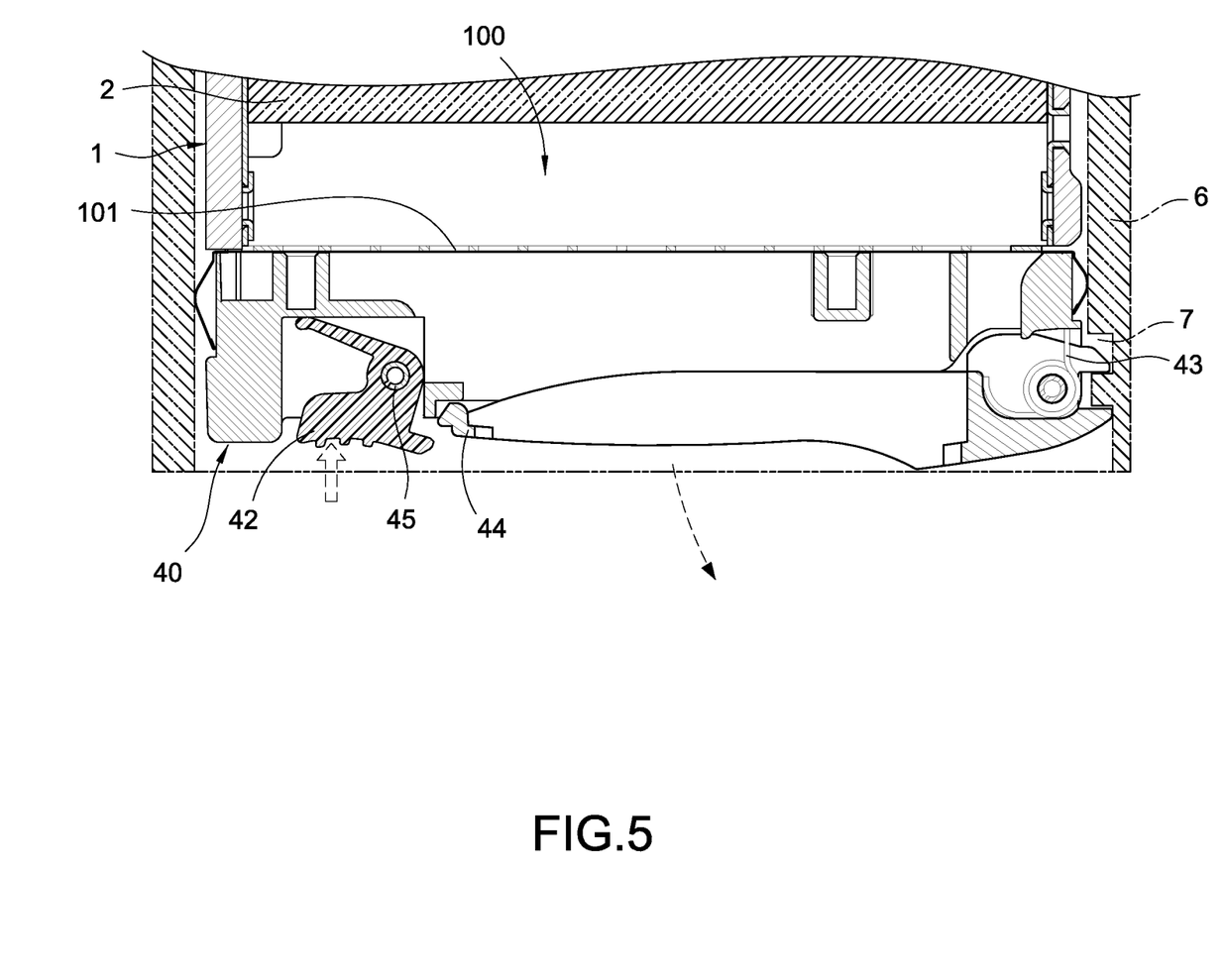
FIG. 5 is a schematic view showing an operating status of the handle structure according to the present invention.

Please refer from FIG. 4 to FIG. 6, wherein FIG. 4 is a perspective exploded view showing the handle structure according to the present invention; FIG. 5 is a schematic view showing an operating status of the handle structure according to the present invention; and FIG. 6 is a schematic view showing the handle structure being in an opened status according to the present invention. According to one embodiment of the present invention, the handle structure 40 includes a pivotal connecting seat 41, a pressing member 42, a torsion spring 43, a handgrip 44 and a plurality of pivotal shafts 45. One end of the handgrip 44 is pivoted at one side of the pivotal connecting seat 41 through the pivotal shaft 45 and the torsion spring 43, the pressing member 42 is pivoted at another side of the pivotal connecting seat 41 through the pivotal shaft 45, and the pressing member 42 is able to abut against another end of the handgrip 44 through a pivotal rotation means.

As shown in FIG. 5, when one end of the handgrip 44 is pivotally rotated, an elastic recovery force is provided through the torsion spring 43; when the handgrip 44 is not desired to be used, the handgrip 44 is pressed by the pressing member 42 so as to be stored at one side of the pivotal connecting seat 41 in a direction parallel to the pivotal connecting seat 41, When the handgrip 44 is desired to be opened, one side of the pressing member 42 is pressed for allowing the handgrip 44 not to be pressed by the pressing member 42. As shown in FIG. 6, when the handgrip 44 is not pressed by the pressing member 42, the handgrip 44 is able to be rotated and released from the pivotal connecting seat 41 through the elastic recovery force provided by the torsion spring 43.

What shall be addressed is that the screw-free removable hard disk case 1 is disposed in machine frame 6, and the machine frame 6 is formed with a recessed part 7 corresponding to one end of the handgrip 44. When the handle structure 40 is rotated for being engaged, one distal end of the handgrip 44 is received in the recessed part 7; and when the handle structure 40 is opened, one distal end of the handgrip 44 is rotated for being released from the recessed part 7. Accordingly, the screw-free removable hard disk case 1 can be prevented from being removed from the machine frame 6 while being in an operating status, thereby increasing the operation safety.

Figure 7:
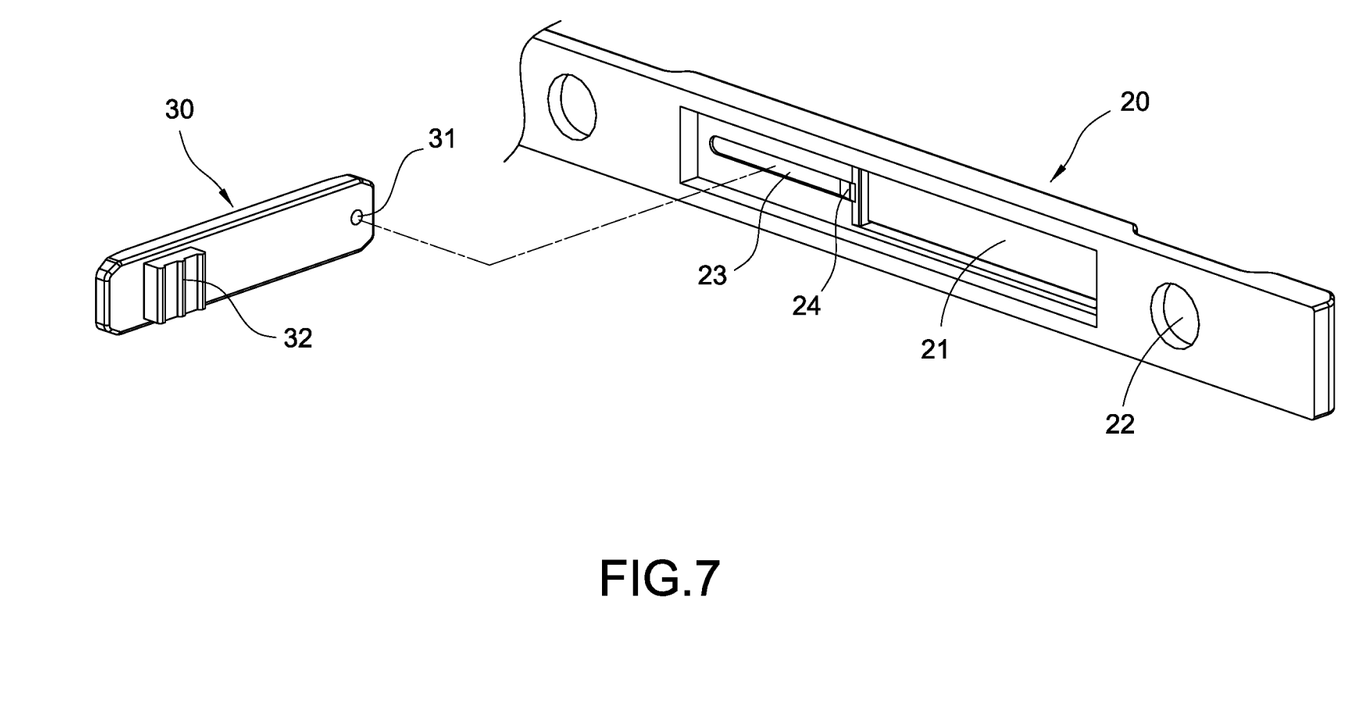
FIG. 7 is a schematic view showing the combination of the slide rail and a slide sheet according to the present invention.
Figure 8:
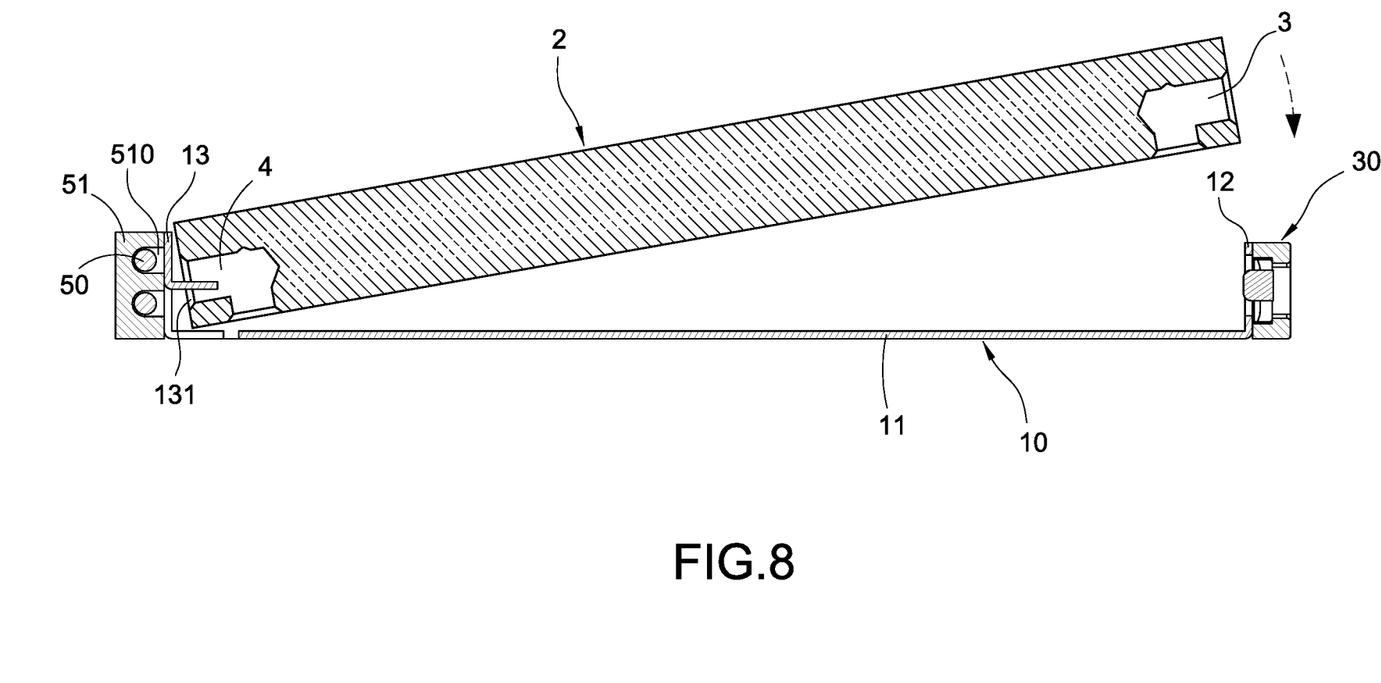
FIG. 8 is a schematic view showing a hard disk and the carrier being positioned according to the present invention.
Figure 9:
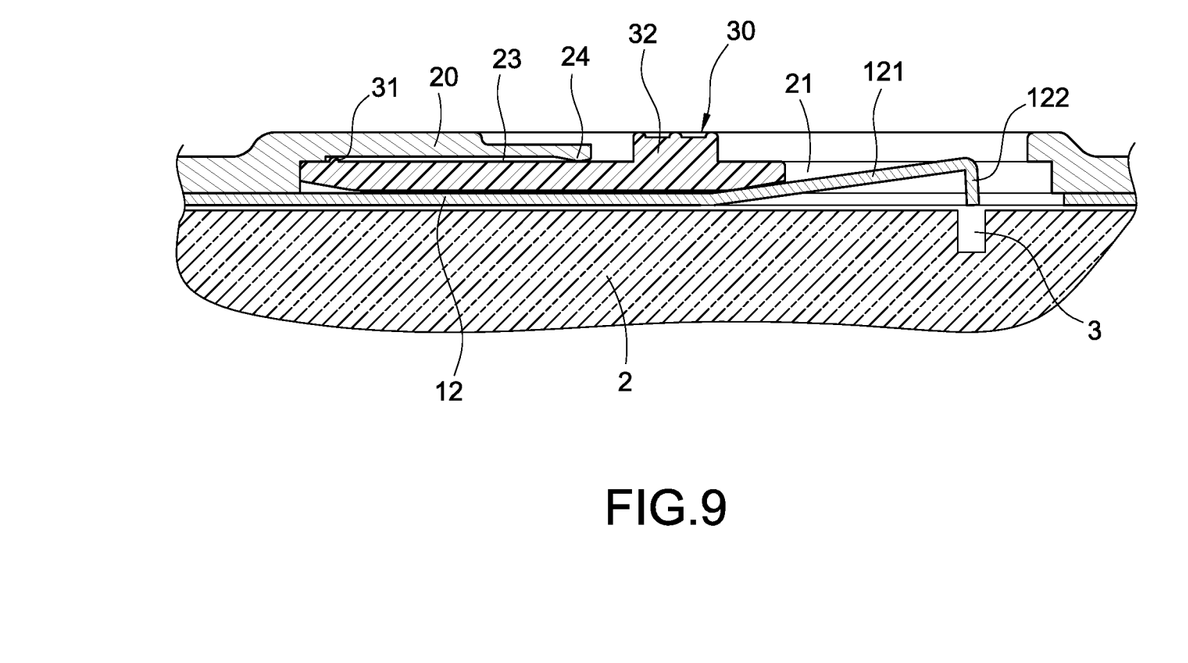
FIG. 9 is a cross sectional view showing the assembly of the slide rail and the slide sheet according to the present invention.
Figure 10:
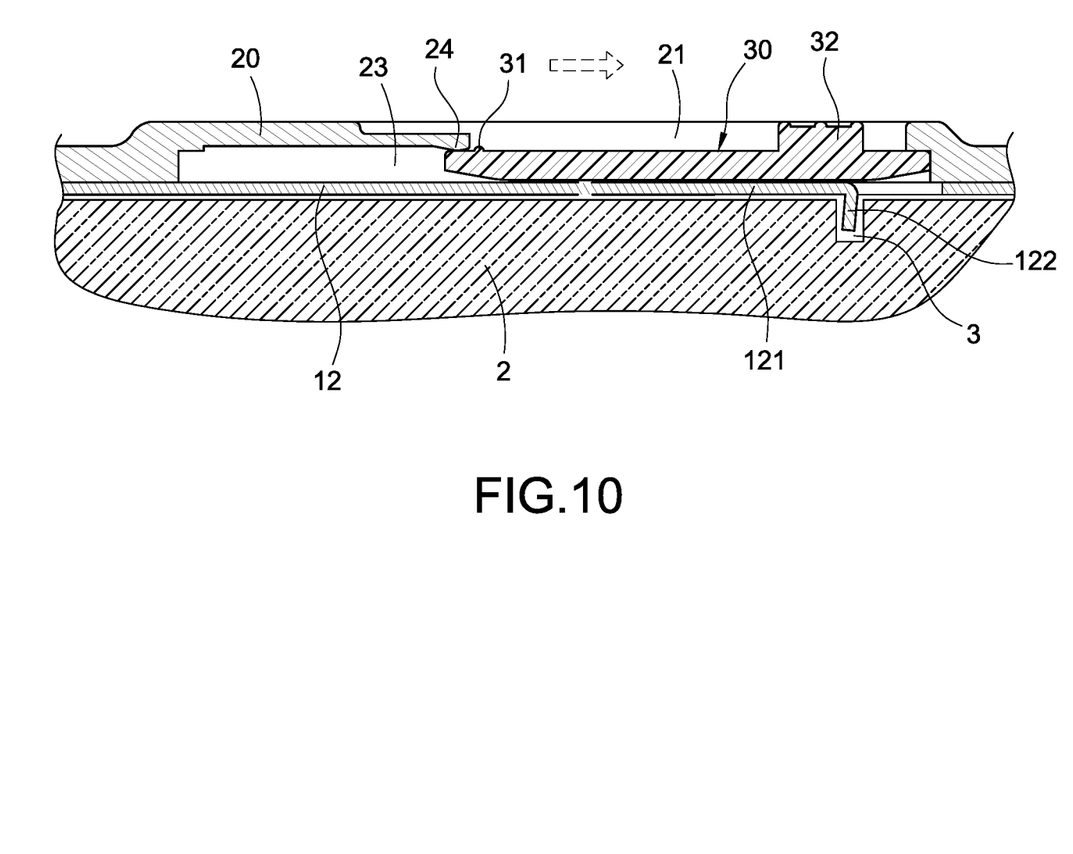
FIG. 10 is a cross sectional view showing the slide sheet abutting against an elastic arm according to the present invention.

Please refer from FIG. 7 to FIG. 10, wherein FIG. 7 is a schematic view showing the combination of the slide rail and a slide sheet according to the present invention; FIG. 8 is a schematic view showing a hard disk and the carrier being positioned according to the present invention; FIG. 9 is a cross sectional view showing the assembly of the slide rail and the slide sheet according to the present invention; and FIG. 10 is a cross sectional view showing the slide sheet abutting against an elastic arm according to the present invention. As shown in FIG. 7, according to this embodiment, the slide rail 20 is formed with a guide groove 23 on a lateral surface facing the first lateral plate 12 and an inclined surface 24 protruded towards the guide groove 23; and the slide sheet 30 is formed with a protrusion 31 corresponding to the guide groove 23.

As shown in FIG. 8, according to this embodiment, the hard disk 2 is formed with at least one positioning hole 4 at one side facing the second lateral plate 13; and the second lateral plate 13 is formed with at least one positioning sheet 131 corresponding to the positioning hole 4. The hard disk 2 is able to be leaned against one side of the second lateral plate 13 through the positioning hole 4 and the positioning sheet 131 being mutually positioned. When the hard disk 2 is desired to be installed, the hard disk 2 is disposed on the carrier 10, one side of the hard disk 2 is abutted against the second lateral plate 13, and the positioning hole 40 is aimed at the positioning sheet 131, so that another side of the hard disk 2 is able to be laterally rotated for being accommodated in the accommodation space 100 of the carrier 10.

As shown in FIG. 9, according to this embodiment, the slide sheet 30 is combined on the slide rail 20 with a sliding means through the protrusion 31 being displaced in the guide groove 23, and the slide sheet 30 is able to slide from one side of the slide groove 21 to another side of the slide groove 21. The slide sheet 30 is formed with a protruding block 32 at one side facing the slide rail 20, and the protruding block 32 is exposed in the slide groove 21 for allowing a user to apply an external force for the purpose of displacement As shown in FIG. 10, when the slide sheet 30 slides from one side of the slide groove 21 to another side of the slide groove 21, the elastic arm 121 is pressed by the slide sheet 30, when the slide sheet 30 is displaced to the distal end of the slide groove 21 and buckled with the slide groove 21, the insertion pin 122 is pressed by the slide sheet 30 for being inserted in the lock hole 3 of the hard disk 2, so that the hard disk 2 is combined in the accommodation space 100 through the insertion pin 122 and the lock hole 3 being mutually buckled. What shall be addressed is that the protrusion 31 of the slide sheet 30 is blocked by the inclined surface 24 of the slide rail 20 thereby unable to be displaced back to the guide groove 23 without any purposeful operation.

Based on what has been disclosed above, one side of the hard disk 2 is leaned against at one side of the second lateral plate 13 through the positioning hole 4 and the positioning sheet 131 being mutually positioned. Another side of the hard disk 2 is positioned through the insertion pin 122 and the lock hole 3 being mutually buckled, so that the hard disk 2 is able to be stably combined in the accommodation space 100.

Figure 11:
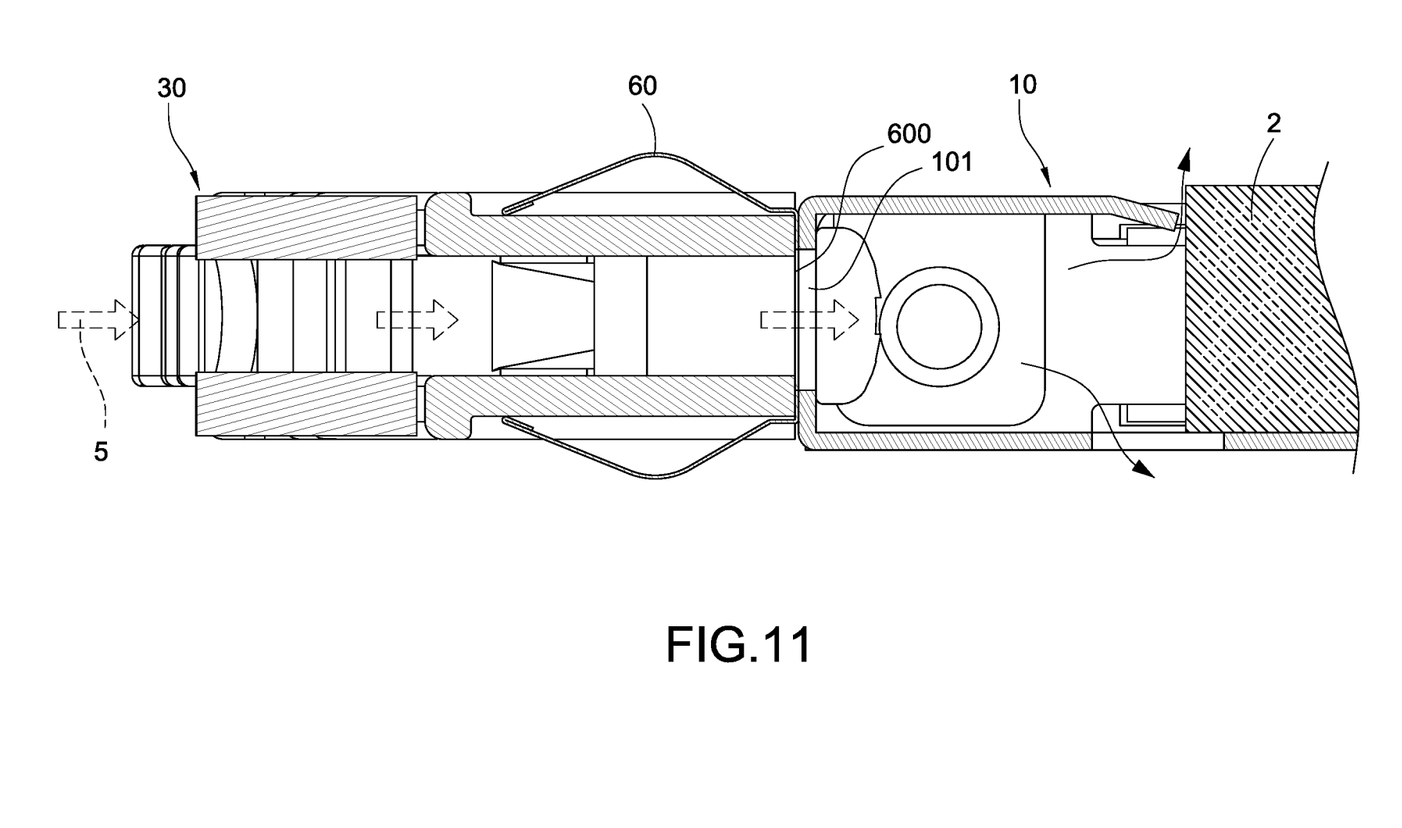
FIG. 11 is a schematic view showing a flowing status of airflow while the screw-free removable hard disk case being in use according to the present invention.

Please refer to FIG. 11, which is a schematic view showing a flowing status of an airflow while the screw-free removable hard disk case being in use according to the present invention. What shall be addressed is that, according to this embodiment, the EMI clip 60 is formed with a plurality of grid holes 600 (as shown in FIG. 3) at one side facing the accommodation space 100, the carrier 10 is formed with heat dissipation holes 101 at one side facing the handle structure 40, and the handgrip 44 is formed with a hollow slot 440. Accordingly, an external airflow 5 can be introduced from the hollow slot 440 of the handgrip 44 and flow through the handgrip 44 and the EMI clip 60 then lastly flow through the grid holes 600 of the EMI clip 60 and the heat dissipation holes 101 of the carrier 10 for performing a heat dissipating operation to the hard disk 2.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An apparatus, comprising:
   a carrier, including a bottom plate, a first lateral plate and a second lateral plate connected to the bottom plate, wherein an accommodation space is defined by the bottom plate, the first lateral plate and the second lateral plate, the first lateral plate is formed with at least one elastic arm, and the elastic arm is disposed with at least one insertion pin corresponding to the lock hole;
   a slide rail, disposed at an outer side of the first lateral plate, wherein the slide rail is formed with a slide through groove corresponding to the elastic arm; and
   at least one slide sheet, combined between the slide rail and the first lateral plate with a sliding means and exposed in the slide through groove, wherein the insertion pin is configured to be inserted in the lock hole by being pressed by the slide sheet, and the apparatus is configured to accommodate a hard disk having at least one lock hole in the accommodation space by mutually buckling the insertion pin and the lock hole,
   wherein a guide groove is formed on the slide rail adjacent to the slide through groove, and
   wherein a protrusion is formed on the at least one slide sheet and is slidably disposed in the guide groove.

2. The apparatus according to claim 1, wherein the first lateral plate is formed with a plurality of convex pieces, the slide rail is correspondingly formed with a plurality of buckle holes, the slide rail is combined with the first lateral plate through the buckle holes and the convex pieces being mutually buckled with each other.

3. The apparatus according to claim 1, wherein an inclined surface is formed at a distal end of the guide groove, the slide sheet is able to slide from one side of the slide through groove to another side of the slide through groove through the protrusion being displaced in the guide groove, and the protrusion is blocked by the inclined surface thereby unable to be displaced back to the guide groove.

4. The apparatus according to claim 1, wherein the slide sheet is formed with a protruding block at one side facing the slide rail, and the protruding block is exposed in the slide through groove.

5. The apparatus according to claim 1, wherein the hard disk is formed with at least one positioning hole, the second lateral plate is formed with at least one positioning sheet corresponding to the positioning hole, and the hard disk is leaned against the second lateral plate through the positioning hole and the positioning sheet being mutually positioned.

6. The apparatus according to claim 1, wherein there are two lock holes formed at one side of the hard disk, there are two elastic arms formed on the first lateral plate, the two elastic arms are arranged at two ends of the first lateral plate respectively and each of the two elastic arms has the insertion pin, there are two slide grooves, which are corresponding to the two elastic arms, formed in the slide rail, the amount of the slide sheets is corresponding to the amount of the elastic arms and the amount is two, the two slide sheets are respectively displaced in the two slide through grooves towards directions away from each other, so that the insertion pins of the two elastic arms are enabled to be inserted in the two lock holes.

7. The apparatus according to claim 1, further including a plurality of light guiding units and a support plate, the support plate is formed with a plurality of penetrated slots, and the light guiding units are correspondingly disposed in the penetrated slots.

8. The apparatus according to claim 1, further including a handle structure combined with the carrier, the handle structure includes a pivotal connecting seat, a pressing member, a torsion spring, a handgrip and a plurality of pivotal shafts, one end of the handgrip is pivoted at one side of the pivotal connecting seat through one of the pivotal shafts and the torsion spring, the pressing member is pivoted at another side of the pivotal connecting seat through another one of the pivotal shafts, and the pressing member is able to abut against another end of the handgrip through a pivotal rotation means.

9. The apparatus according to claim 8, further including an EMI clip, the EMI clip is fastened between the carrier and the handgrip by utilizing a plurality of fastening members.

10. The apparatus according to claim 9, wherein the EMI clip is formed with a plurality of grid holes at one side facing the accommodation space, the handgrip is formed with a hollow slot, an external airflow is introduced from the hollow slot and flows through the handgrip and the EMI clip then flows through the grid holes for performing a heat dissipating operation to the hard disk.

* * * * *